United States Patent [19]
Banks

[11] 3,911,438
[45] Oct. 7, 1975

[54] PROXIMITY SENSING DEVICE
[75] Inventor: Donald S. Banks, Wellesley, Mass.
[73] Assignee: The United States of America as represented by the Secretary of the Navy, Washington, D.C.
[22] Filed: Aug. 31, 1966
[21] Appl. No.: 576,784

[52] U.S. Cl. ........ 343/113 R; 102/70.2 P; 343/7 PF; 343/12 MD
[51] Int. Cl.[2] .......................................... F42C 13/04
[58] Field of Search .......... 343/7 PF, 7 ED, 12 MD, 343/112 D, 113 DE, 113 R, 18 E; 102/70.2 P

[56] References Cited
UNITED STATES PATENTS

| | | | |
|---|---|---|---|
| 2,958,866 | 11/1960 | Atanasoff | 343/112 |
| 3,113,305 | 12/1963 | Trounson et al. | 343/7 |
| 3,138,101 | 6/1964 | Lobelle | 102/70.2 |
| 3,332,077 | 7/1967 | Nard et al. | 343/7 |

*Primary Examiner*—T. H. Tubbesing
*Attorney, Agent, or Firm*—G. J. Rubens; Henry Hansen

[57] ABSTRACT

A jamming signal responsive, proximity sensing fuse for detonating a missile warhead within the anticipated lethal volume of a target emitting a jamming signal. The fuse includes a missile carried antenna having two diametrically opposed pairs of longitudinally spaced, resonant slots. Each slot pair is connected to a respective magic tee for providing a phase difference signal whose frequency varies as a function of the range, bearing and closing velocity of the jamming signal emitting target. The frequency varying phase difference signal is fed to a signal processor which includes a Schmitt trigger for providing a series of rectangular pulses whose timing and durations are controlled by the frequencies of the phase difference signal having an amplitude exceeding predetermined threshold levels. A step counter responsive to the pulses provides a step increasing output voltage which, upon reaching a predetermined threshold level, causes a fuse switch to provide a detonation signal to a warhead detonator. Circuitry is provided to assure that the detonation signal will not be produced when less than a predetermined number of pulses have been provided within a predetermined time interval.

11 Claims, 5 Drawing Figures

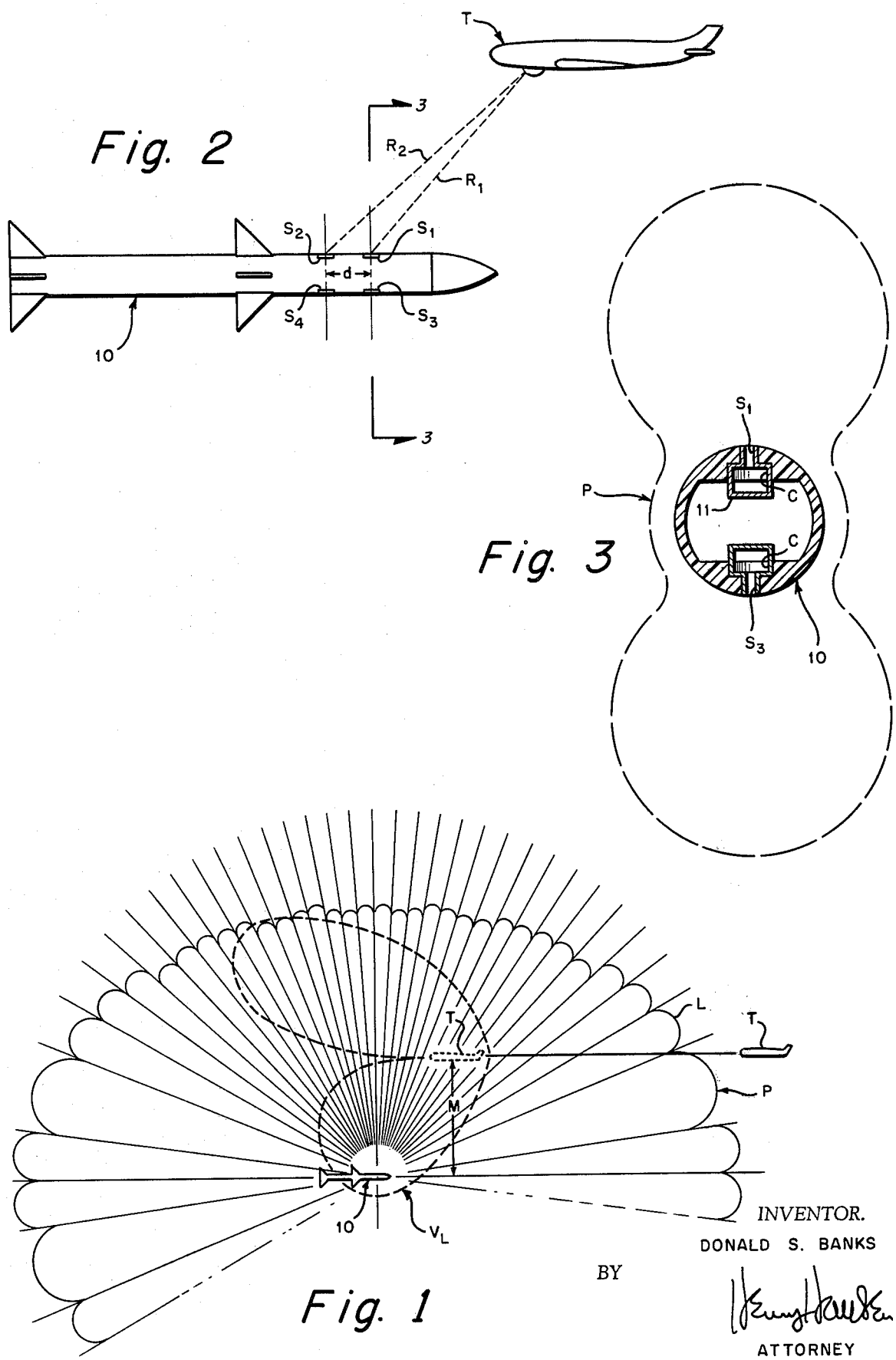

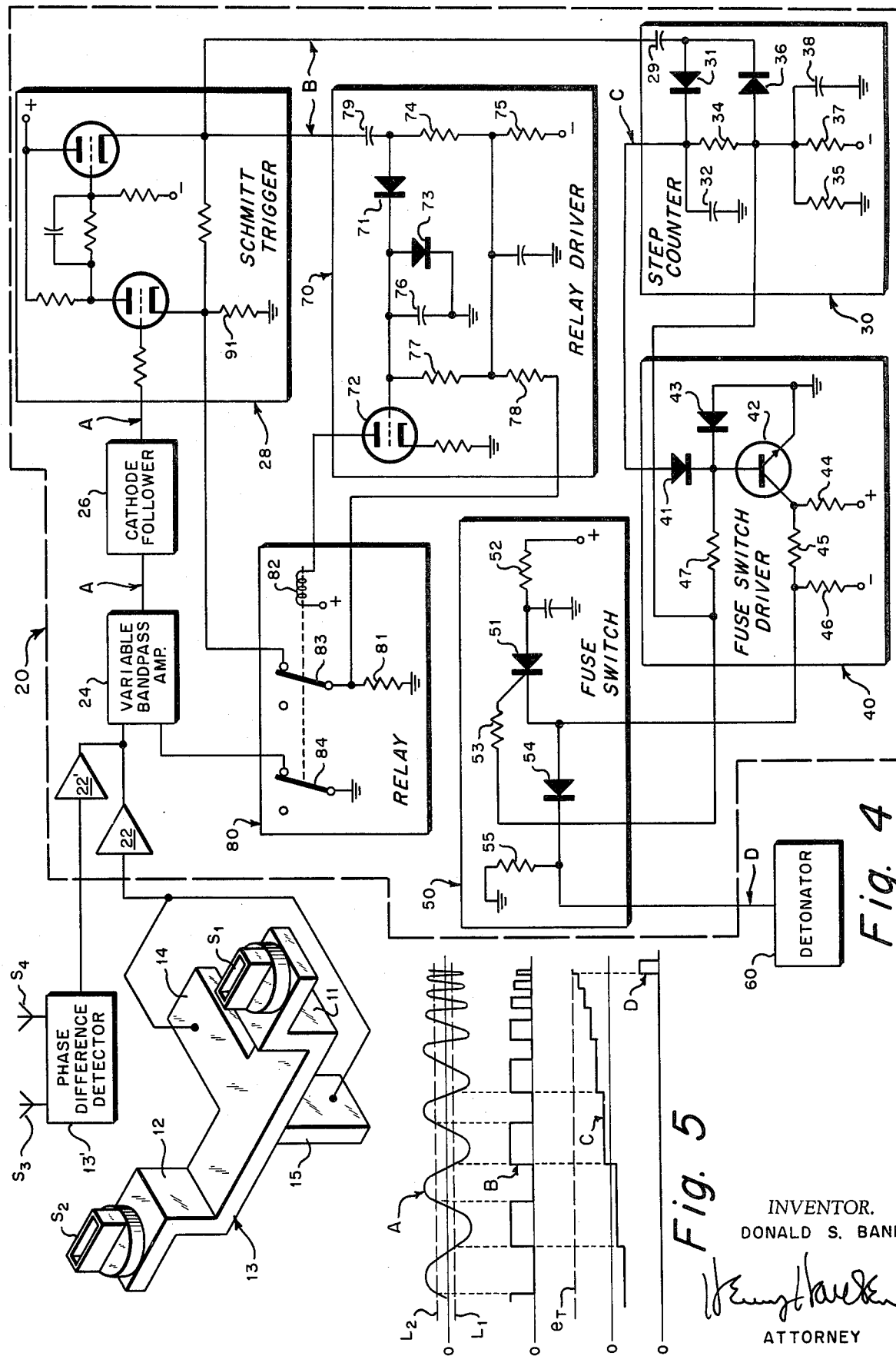

PROXIMITY SENSING DEVICE

This invention relates generally to proximity fuses for detonating warheads and, more particularly, to proximity fuses which are responsive to target-emitted radar jamming signals.

It is known that a missile need not directly collide with its target in order to destroy the target. The target may be envisioned as being enveloped by a lethal volume within which warhead detonation will effect a destruction of the target. The boundary of this volume is determined by the vulnerability of the aircraft to warhead generated explosions. Proximity-sensitive fuses have been developed which will cause warhead detonation when the warhead is positioned within the predetermined lethal volume of the target. However, known proximity fuses usually operate upon radar or Doppler principles and are rendered inoperable when the target emits a radar jamming signal.

It is a general purpose of this invention to provide a proximity fuse which is fully operative in response to target-emitted radar jamming signals. Briefly, this is accomplished by the provision of an inferometer type fuse including antennas for sensing the target-emitted jamming signal at two spaced locations, a phase detector for receiving the sensed signals and producing a phase difference signal, and a signal processor for activating detonation of the missile warhead in response to a predetermined variation in the phase difference signal.

Accordingly, an object of the present invention is the provision of an improved proximity warhead detonation fuse.

Another object of the invention is the provision of a proximity fuse which is operable to detonate a warhead within the lethal volume of a target in response to a target-emitted radar jamming countermeasure signal.

Other objects and advantages of the invention will hereinafter become more fully apparent from the following description of the annexed drawing which illustrates a preferred embodiment and wherein:

FIG. 1 is a diagrammatic view in elevation of a missile in flight approaching a target aircraft and containing a proximity fuse according to the invention, and superimposed with a fragmentary portion of an antenna pattern of the fuse and a postulated lethal volume of the target aircraft;

FIG. 2 is an enlarged diagrammatic view in elevation of the missile and aircraft of FIG. 1 showing longitudinally spaced resonant slots of diametrically opposed antennas of the fuse;

FIG. 3 represents an enlarged cross sectional view of the missile of FIG. 2 taken along the line 3—3 and superimposed with a cross section of the antenna pattern of FIG. 1;

FIG. 4 represents a block and partial schematic circuit diagram of the fuse as applied to FIG. 1 and includes an isometric view of the antennas for one side of the missile; and FIG. 5 is a timing diagram of selected waveforms present in the circuit of FIG. 4 during operation of the fuse.

The fuse according to the invention basically operates on an interferometric principle as will now be explained. Referring to FIG. 1, it is seen that as a target T relatively approaches a missile 10 including the fuse hereinafter described, it passes through one or more lobes L of a receiving antenna pattern P associated with the fuse. As shown in FIG. 2, the fuse includes diametrically opposed pairs of resonant slots $S_1$ and $S_2$, and $S_3$ and $S_4$ positioned along the lateral surface of the missile 10. Alternatively, these slots may be mounted in externally mounted tunnel farings. These slots are excited as shown in FIG. 3 by respective resonant cavities C which are well known. The slots on a given side are spaced apart a distance $d$ and in combination produce the symmetrical fan-like receiving antenna pattern P for that side. The complementary pair of slots on the other side of the missile 10 creates an identical pattern and enables receiving capability in all directions from the missile 10. Of course, as the signal source moves about the periphery of the missile 10, the level of sensitivity is greatest at points directly opposite the slots as figuratively indicated in FIG. 3. Additionally, the missile 10 during flight usually rotates about its longitudinal axis and thereby insures the reception of a jamming signal no matter what the relative altitude and bearing of the target may be.

Referring to FIG. 2, a radar-jamming signal emanates from target T along path $R_1$ to resonant slot $S_1$ of the fuse and along path $R_2$ to resonant slot $S_2$. When target T is a long distance away from and directly in front of the missile 10, the path length $R_2$ substantially equals the path length $R_1$ plus the distance d between the slots $S_1$ and $S_2$. Conversely, when the target T is directly opposite the slots $S_1$ and $S_2$, the path lengths $R_2$ and $R_1$ are equal. As the missile 10 closes with the target T along a non-collision course, the missile 10 will pass to one side of the target T at a miss distance M, as shown in FIG. 1. Therefore, as the line of sight from the symmetrical center of one side of the antenna array to the target T increases from 0° to 90°, R, the instantaneous difference between the path lengths $R_2$ and $R_1$, varies from $d$ to 0. At any point in time, the signal as sensed by slot $S_2$ will differ in phase from the signal sensed at slot $S_1$ as a function of R. If $d$ is much greater than the wave length $\lambda$ of the radar jamming signal, it can be seen that the signals sensed by the slots $S_1$ and $S_2$ will be in phase each time R decreases to a length which is an integral multiple of $\lambda$.

From the above, it is seen that for a given predicted miss distance M between the missile 10 and the target T, the time at which the missile 10 will most probably be positioned at an optimum bearing to be within the lethal volume $V_L$ of the target T can be predicted by counting the number of times the changing difference in phase between the signals received at the two slots $S_1$ and $S_2$ goes through a complete cycle. For example, in FIG. 1 the optimum bearing and therefore the optimum point in time for detonation of the missile warhead with respect to the lethal volume shown appears to be when the target T is passing through the eighth, ninth or tenth lobes L of the pattern P as counted from the foward portion of the missile axis. Warhead detonation characteristics and the closing velocity of the missile relative to the target also effect the optimum bearing. Further, since the instantaneous frequency of the change in phase will be greater as the miss distance M becomes smaller, whether or not the missile 10 will be close enough to the target T to be positioned within the lethal volume $V_L$ can be ascertained.

Referring now to FIG. 4, the radar jamming signal from target T is received at both slots $S_1$ and $S_2$ of the fuse, and the two input signals propagate through respective conventional wave guides 11 and 12 to collinear arms of a magic tee 13 which is arranged as a balanced crystal mixer to function as a jamming signal phase difference detector. The physical dimensions of the slots $S_1$ and $S_2$, their respective resonant cavities C, the wave guide 11, 12 and the magic tee 13 are conventionally dependent upon the anticipated frequency of the target-emitted radar jamming signal which may have a frequency as in the X band. The vector sum of the two input jamming signals is detectable as by a crystal detector, not shown, in the H-plane arm 14 of the magic tee 13, while the vector difference of the two input signals is detectable in the E-plane arm 15. Well known crystal detectors, not shown, one each arranged respectively in the H-plane arm 14 and the E-plane arm 15 are electrically positioned to be oppositely poled and connected for functioning together as a balanced crystal mixer, the outputs thereof being electrically combined so that a phase difference signal resembling waveform A shown in FIG. 5 is obtained which has a maximum as when the signals are in phase and a minimum as when the signals are 180° out of phase. This phase difference signal is fed into a signal processor 20 to an input terminal of an emitter follower amplifier 22.

In order to provide coverage for both sides of the missile 10, the signals sensed by the resonant slots $S_3$ and $S_4$ are similarly fed into a phase difference detector 13' which produces a similar phase difference signal fed into the signal processor 20 to an input terminal of an emitter follower amplifier 22'.

The outputs of the emitter follower amplifiers 22 and 22' are combined and fed to a variable band pass amplifier 24 which is capable of passing signals having a very low frequency, signals of high frequencies being normally by-passed to ground as through a selectively grounded capacitor. The output wave-form A of the amplifier 24 is fed through a cathode follower 26 into a bi-polar switch such as a Schmitt trigger 28. In response to receiving the waveform A of a sufficiently great amplitude from the amplifier 24, the Schmitt trigger 28 produces rectangular waveform B which goes positive when the phase difference signal A drops below a predetermined threshold level $L_1$ and returns to zero when the phase difference signal exceeds a corresponding predetermined threshold level $L_2$. If the jamming signal emanating from the target T is too weak to be effective against the missile's radar system as when the target T is too far away from the missile, the resulting amplitude of the amplified waveform A will not be sufficient to activate the production of the waveform B by the Schmitt trigger 28. This effect can be further enhanced by controlling the attenuation of the low frequency response of the amplifier 24. Therefore, a check is provided to assure that the warhead will not be detonated when the probable miss distance M is so great that the missile 10 will not be positioned in lethal proximity to the target within the lethal volume $V_L$ thereof even through the target may be positioned at the optimum bearing.

The waveform B is fed through a decoupling capacitor 29 into a step-counter 30 and is applied through a diode 31 to a terminal of a grounded capacitor 32. A capacitor discharge path to ground is provided through a pair of serially connected resistors 34 and 35, the resistor 34 having a substantially larger resistane. An oppositely poled diode 36 is connected in parallel across the diode 31 and the resistor 34 to divert the negative going portion of waveform B to ground through the resistor 35. A resistor 37 is connected between a negative power supply and the junction of the resistors 34 and 35 to form with the resistor 35 a voltage divider for providing a normally negative bias potential across the capacitor 32. A grounded capacitor 38 is connected to the junction of the resistors 35 and 37 to maintain the negative bias and may have a relatively long time constant of discharge to ground through the resistor 35 such as one-tenth of a second. The time constant of discharge of the capacitor 32 to ground through resistors 34 and 35 is somewhat greater and has a predetermined value, hereinafter more fully explained, such as one-third of a second.

The positive going portion of the waveform B is applied through the diode 31 to decrease the negative bias potential maintained across the capacitor 32. For phase difference signals of low frequency the capacitor 32 is able almost completely to discharge through the resistors 34 and 35 during the negative going portions of the waveform B. However, the capacitor 32 does not have time to discharge fully by reason of the aforesaid time constant of discharge as the missile approaches the target and the rate of change of R through successive integral multiples of λ increases to cause the phase difference signal frequency to increase. Of course, the frequency is also affected by the closing velocity of the missile 10. The more rapidly occurring positive portions of the waveform B allow a positive potential to be built up across the capacitor 32. The positive potential is applied as an input signal to the anode of a diode 41 in a fuse switch driver 40. The cathode of the diode 41 is connected through a resistor 47 to the normally negative junction of the resistors 34 and 35 in the counter 30 and also is connected with the base of a transistor 42 having a grounded emitter. A blocking diode 43 is connected between the base and the grounded emitter of the transistor 42. The collector of the transistor 42 is connected to a first intermediate tap terminal of a voltage divider network including resistors 44, 45 and 46 serially connected between positive and negative D.C. power supplies.

The other intermediate tap terminal between the resistors 45 and 46 is connected to the cathode of an SCR (silicon controlled rectifier) 51 in a fuse switch 50. The anode of the SCR 51 is connected through a resistor 52 to a positive D.C. power supply, while the gate thereof is connected through a resistor 53 to the normally negative junction of the resistors 34 and 35 of the counter 30. The cathode of SCR 51 is also connected with the anode of a diode 54 whose cathode is connected through a resistor 55 to ground. The output of the fuse switch 50 appears across the resistor 55 and is fed to a warhead detonator 60.

The negative bias potential at the junction of the resistors 34 and 35 as applied through the resistor 53 to the gate of the SCR 51 is normally sufficiently negative relative to the voltage applied to the cathode of the SCR 51 from the voltage divider network in the fuse switch driver 40 to maintain the SCR 51 in a state of non-conduction. When the potential C across the capacitor 32 incrementally increases in steps to a selected predetermined value $e_T$ occurring coincidentally with the predetermined optimum bearing of the target T, the diode 41 is forward biased and causes the transistor 42 to be thrown into a state of conduction, effectively causing the collector of the transistor 42 to be connected with ground. Consequently, the voltage appearing at the junction of the resistors 45 and 46 which is applied to the cathode of the SCR 51 suddenly becomes more negative causing the SCR 51 to conduct. When the SCR 51 conducts, the diode 54 is suddenly forward biased and a resulting rapid increase of current flow through the resistor 55 to ground generates a pulse D fed to the warhead detonator 60 for activating detonation.

The rectangular waveform B from the Schmitt trigger 28 is also fed through a coupling capacitor 79 to the anode of a diode 71 in a relay driver 70. The cathode of the diode 71 is connected with both the grid of a triode 72 and the anode of a diode 73 whose cathode is grounded. The anode of the diode 71 is normally biased negative through a pair of serially connected resistors 74 and 75 connected with a negative power supply. A capacitor 76 is connected in parallel across the diode 73. A resistor 77 is connected between the grid of the triode 72 and the junction between the resistors 74 and 75. A resistor 78 is connected between a resistor 81 in a relay 80 and the junction of the resistors 74, 75 and 77. The plate of the triode 72 is connected with a coil 82 in the relay 80.

When the triode 72 is biased into a state of conduction, the relay 80 is energized to cause a pair of switches 83 and 84 to disconnect from their respective first terminals. Switch 83 has a second terminal connected with ground through the resistor 81 and has its first terminal connected with a cathode resistor 91 in the first stage of the Schmitt trigger 28. Switch 84 has a second terminal connected with ground and has its first terminal connected to control the band pass characteristics of the vertical band pass amplifier 24 as by providing a selectively breakable connection to ground for high frequency by-pass capacitors in the amplifier 24.

Normally the triode 72 in the driver 70 is biased into cutoff by the negative bias voltage appearing at the junction of the resistors 75 and 78 and applied through the resistor 77 to the capacitor 76. When the positive going portion of the waveform B is applied through the diode 71 to the capacitor 76, the capacitor 76 discharges from its initial negative state through the resistors 77, 78 and 81 to ground; and the triode 72 is caused to conduct when the capacitor 76 charges up to the necessary potential. This causes the relay 80 to energize so that the switches 83 and 84 disconnect from their first terminals.

Prior to disconnection of the switch 84, higher frequencies are by-passed as by capacitors in the output stages of the amplifier 24 to ground through the switch 84. Upon disconnection, the higher frequencies of waveform A may be amplified and fed through the cathode follower 26 to the Schmitt trigger 28.

The resistor 91 has a much lower resistance than the resistor 81 so that upon disconnection of switch 83 from its first terminal when the relay 80 is energized, the potential at the junction between the resistors 78 and 75 suddenly decreases. This decrease in potential is applied to the capacitor 76 through the resistor 77; and, when capacitor 76 becomes sufficiently negative, the triode 72 is cut off and the relay 80 de-energizes to cause the switches 82 and 83 to reconnect with their first terminals. The time constant of discharge of the capacitor 76 through resistors 77, 78 and 81 has a predetermined value, such as 1 second, to assure that the predetermined number of phase shift cycles will be counted in a predetermined interval of time to activate the output of the firing pulse D from the fuse switch 50 to the detonator 60 while the warhead of the missile is close enough to and at the optimum bearing from the target to be within the lethal volume $V_L$.

Thus is provided circuitry to de-activate the fuse in case the miss distance M between the missile 10 and the target T is so great that the missile 10 will not be positioned within the lethal volume $V_L$ at the time of the activation of detonation of its warhead by the fuse. If the predetermined count has not been achieved within the time limit set by the time constant of discharge of the capacitor 76 through the resistors 77, 78, and 81, the fuse will not activate detonation because the capacitor 32 will never become charged up to the necessary threshold voltage $e_T$ to activate the fuse switch driver 40, the high frequency waveform A being diverted to ground through reconnected switch 84.

As a safety measure the anode and the cathode of the diode 54 in the fuse switch 50 are normally grounded through well known safety circuitry, not shown. In order to activate the fuse, these safety grounds must each be removed from the anode and the cathode of the diode 54 to enable the production of the output firing pulse D.

From the above, it appears that there has been provided a proximity fuse which is operable in response to a radar jamming signal emanating from a target to actuate detonation of the missile warhead at a time when the missile 10 will more probably be positioned within the anticipated lethal volume $V_L$ of a target T. The fuse may be used alone or in combination with other fuses by means of controlling the selected grounding of the anode and cathode of the diode 54 or by use of other well known means of disconnecting or preventing the production of the output detonation pulse D. A fuse according to the invention is operable in response to radar jamming signals of many sorts including wide band noise or carcinatron barrage jamming.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus for detonating an explosive warhead in a missile in lethal proximity to a target which is emitting a jamming signal comprising:
antenna means adapted to be carried by the missile for sensing the target emitted jamming signal;
means connected to said antenna means and responsive to the jamming signal sensed for providing an output signal having a frequency which varies as a function of target bearing relative to the missile; and
detonation signal producing means connected to said jamming signal responsive means for receiving said output signal and responsive thereto for providing a detonation signal to the warhead when the missile is positioned in lethal proximity to the target.

2. Apparatus according to claim 1 wherein said antenna means includes:
means for sensing the jamming signal at a plurality of spaced locations.

3. Apparatus for detonating an explosive warhead in a missile in lethal proximity to a target which is emitting a jamming signal comprising:

antenna means adapted to be carried by the missile for sensing the target emitted jamming signal at a plurality of spaced locations;

phase detecting means connected to said antenna means and responsive to the jamming signal sensed for providing a phase difference signal having a frequency which varies as a function of target bearing relative to the missile and being indicative of the magnitude of the phase difference between the phase of the signal sensed at one of said locations and that of the signal sensed at another of said locations; and signal processing means connected to said phase detecting means for receiving said phase difference signal and for providing a detonation signal to the warhead in response to a predetermined variation of said phase difference signal when the missile is positioned in lethal proximity to the target.

4. Apparatus for detonating an explosive warhead in a missile in lethal proximity to a target which is emitting a jamming signal comprising:

antenna means adapted to be carried by the missile for sensing the jamming signal at a plurality of spaced locations;

phase detecting means connected to said antenna means for providing a phase difference signal indicative of the magnitude of phase difference between the phase of the signal sensed at one of said locations and that of the signal sensed at another of said locations;

trigger means connected to said phase detecting means for providing an output signal when said phase difference signal is indicative of a predetermined phase difference; and counter means connected to said trigger means for receiving said output signal and for providing a detonation signal to the warhead in response to receiving a predetermined number of said output signals when the missile is positioned in lethal proximity to the target.

5. Apparatus according to claim 4 wherein said counter means includes means for preventing said detonation signal from being produced when less than said predetermined number of trigger output signals have been provided within a predetermined time interval.

6. Apparatus according to claim 4 wherein said trigger means comprises:

amplifying means connected to said phase detection means for receiving and amplifying said phase difference signal; and bi-polar switch means connected to receive the amplified output of said amplifying means for providing said output signals.

7. Apparatus according to claim 6 wherein said amplifying means includes:

variable band pass means connected to said bipolar switch means and responsive to said output signal thereof for passing high frequency phase difference signals to said bipolar switch means during a predetermined time interval and for attenuating high frequency phase difference signals during other time intervals.

8. Apparatus for detonating an explosive warhead in a missile in lethal proximity to a target which is emitting a jamming signal comprising:

antenna means including a pair of resonant slots spaced apart a greater distance than the wave length of the jamming signal and adapted to be carried by the missile for sensing the jamming signal at a corresponding pair of spaced locations; phase detecting means connected to said antenna means for providing a phase difference signal indicative of the magnitude of the phase difference between the phase of the signal sensed at one of said locations and that of the signal sensed at the other of said locations; and signal processing means connected to said phase detecting means for receiving said phase difference signal and for providing a detonation signal to the warhead in response to a predetermined variation of said phase difference signal when the missile is positioned in lethal proximity to the target.

9. Apparatus according to claim 8 wherein said resonant slots are adapted to be positioned adjacent a lateral surface of the missile, the major dimensions of said slots extending along the same line parallel to the axis of said missile.

10. Apparatus according to claim 9 wherein:

said antenna means further comprises an additional pair of resonant slots adapted to be positioned adjacent a lateral surface of the missile which is diametrically opposite the first said lateral surface, the major dimensions of said additional slots extending along the same line parallel to the axis of said missile, and said additional slots being spaced apart a greater distance than the wave length of the jamming signal; and said detonating signal producing means further comprises additional phase detecting means connected to said phase difference cycle signal means and to said additional pair of resonant slots for providing to said cycle signal means a second phase difference signal indicative of the magnitude of phase difference between the phase of the signal sensed at one of said additional slots, and that of the signal sensed at the other of said additional slots.

11. Apparatus for sensing the proximity of a moving signal source comprising:

antenna means for sensing the signal at a plurality of spaced locations;

phase detecting means connected to said antenna means for providing a phase difference signal indicative of the magnitude of phase difference between the phase of the signal sensed at one of said locations and that of the signal sensed at another of said locations; and signal processing means including trigger means connected to said phase detecting means for receiving said phase difference signal and for providing trigger output pulses each ooccurring in response to said phase difference signal exceeding a first predetermined threshold level and each having a duration controlled in response to said difference signal exceeding a second predetermined threshold level, said processing means further including means for providing a proximity signal pulse in response to receiving a predetermined number of said pulses within a predetermined interval.

* * * * *